(12) United States Patent
Nagashita

(10) Patent No.: US 9,358,889 B2
(45) Date of Patent: Jun. 7, 2016

(54) POWER CONVERSION APPARATUS AND METHOD

(71) Applicant: TOYOTA JIDOSHA KABUSHIKI KAISHA, Toyota-shi, Aichi-ken (JP)

(72) Inventor: Kenichiro Nagashita, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/533,542

(22) Filed: Nov. 5, 2014

(65) Prior Publication Data

US 2015/0137706 A1 May 21, 2015

(30) Foreign Application Priority Data

Nov. 18, 2013 (JP) ................. 2013-238259

(51) Int. Cl.
*H02J 1/00* (2006.01)
*B60L 1/00* (2006.01)
*B60L 1/14* (2006.01)
*H02M 3/335* (2006.01)

(52) U.S. Cl.
CPC ... *B60L 1/00* (2013.01); *B60L 1/14* (2013.01); *H02M 3/33584* (2013.01); *B60L 2210/12* (2013.01); *B60L 2210/14* (2013.01); *B60L 2240/526* (2013.01); *B60L 2240/527* (2013.01); *Y02T 10/7225* (2013.01); *Y02T 10/7233* (2013.01); *Y10T 307/406* (2015.04)

(58) Field of Classification Search
USPC .......... 307/18, 82, 86; 363/123, 131; 180/446
See application file for complete search history.

(56) References Cited

U.S. PATENT DOCUMENTS

| 7,863,838 | B2 * | 1/2011 | Aso ................................. 318/139 |
| 8,583,307 | B2 * | 11/2013 | Kato et al. ....................... 701/22 |
| 2010/0244558 | A1 * | 9/2010 | Mitsutani et al. ............... 307/9.1 |
| 2011/0198933 | A1 | 8/2011 | Ishigaki et al. |

FOREIGN PATENT DOCUMENTS

| JP | 2010119257 A | 5/2010 |
| JP | 2011-193713 A | 9/2011 |
| JP | 2012125040 A | 6/2012 |
| JP | 2012145469 A | 8/2012 |

* cited by examiner

*Primary Examiner* — Thuy Vinh Tran
(74) *Attorney, Agent, or Firm* — Sughrue Mion, PLLC

(57) ABSTRACT

The power conversion apparatus converts power among a plurality of ports, and includes: a first voltage conversion unit that converts a voltage of a first port and outputs power having the converted voltage to a second port; and a second voltage conversion unit that performs a first operation of converting a voltage of one port of the second port and a third port and outputting power having the converted voltage to the other port, or a second operation of converting a voltage of the other port and outputting power having the converted voltage to the one port, and when performing the first operation the second voltage conversion unit switches from the first operation to the second operation when a vehicle condition where power of the one port is insufficient is detected.

15 Claims, 5 Drawing Sheets

POWER CONVERSION APPARATUS AND METHOD

INCORPORATION BY REFERENCE

The disclosure of Japanese Patent Application No. 2013-238259 filed on Nov. 18, 2013 including the specification, drawings and abstract is incorporated herein by reference in its entirety.

BACKGROUND OF THE INVENTION

1. Field of the Invention

The present invention relates to a technique for converting power among a plurality of ports.

2. Description of Related Art

A power conversion apparatus for converting power among a plurality of ports is known (see, for example, Japanese Patent Application Publication No. 2011-193713 (JP 2011-193713)). The power conversion apparatus has a step-up/step-down circuit between the ports for performing a voltage conversion operation to step up or step down voltages of the ports.

SUMMARY OF THE INVENTION

However, power required at a port varies depending on a vehicle condition. Therefore, the step-up/step-down circuit does not necessarily perform a voltage conversion operation suitable for the vehicle condition. Therefore, there is provided a power conversion apparatus and a power conversion method capable of switching voltage conversion operations suitable for the vehicle condition.

According to a first aspect of the invention, there is provided a power conversion apparatus having a plurality of ports and converting power among the plurality of ports, including: a first voltage conversion unit that converts a voltage of a first port and outputs power having the converted voltage to a second port; and a second voltage conversion unit that performs a first operation of converting a voltage of one port of the second port and a third port and outputting power having the converted voltage to the other port, or a second operation of converting a voltage of the other port and outputting power having the converted voltage to the one port, wherein during performing the first operation the second voltage conversion unit switches from the first operation to the second operation when a vehicle condition of insufficient power of the one port is detected.

According to a second aspect of the invention, there is provided a power conversion method for converting power among a plurality of ports, including a step of switching to a first operation of converting a voltage of one port of a second port and a third port and outputting power having the converted voltage to the other port when a voltage of a first port is converted and power having the converted voltage is output to the second port, and switching from the first operation to a second operation of converting a voltage of the other port and outputting power having the converted voltage to the one port when a vehicle condition where power of the one port is insufficient is detected during preforming the first operation.

According to the aspects, it is capable of switching to a voltage conversion operation suitable for a vehicle condition.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Apparatus 100>

Figure 1:
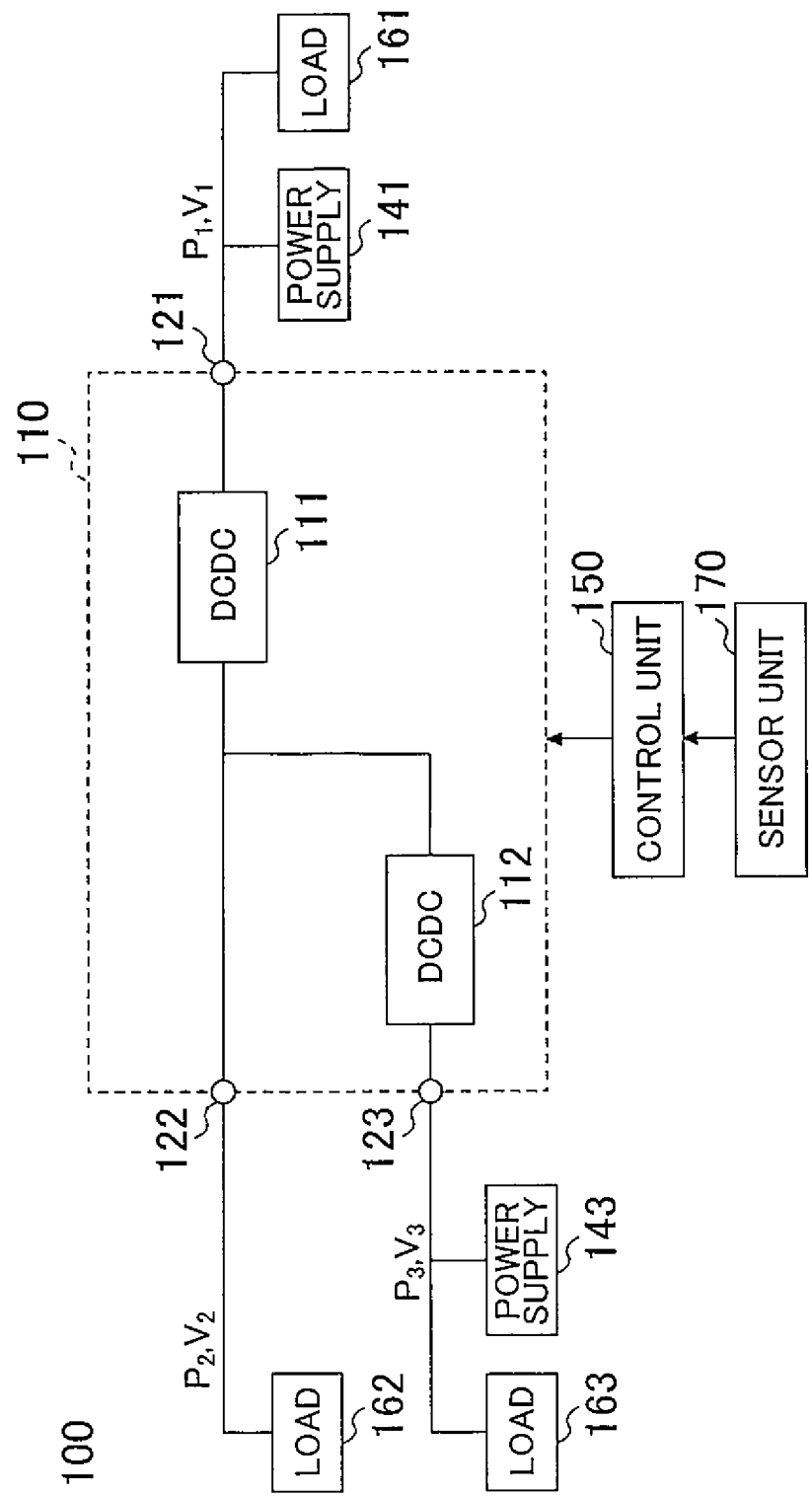
FIG. 1 is a diagram showing an example of a configuration of a power conversion apparatus.

FIG. 1 is a block diagram showing an example of a configuration of a power supply apparatus 100 which is an embodiment of a power conversion apparatus. For example, the power supply apparatus 100 is a power supply system that includes a power supply circuit 110, a control unit 150 and a sensor unit 170. For example, the power supply apparatus 100 is a system that is mounted on a vehicle such as an automobile, and distributes power to various loads of the vehicle. A hybrid vehicle, a plug-in hybrid vehicle, an electric vehicle, and so on may be cited as specific examples of this vehicle. The power supply apparatus 100 may also be mounted on a vehicle using an engine as a driving source.

The power supply circuit 110 is a power conversion circuit having three ports 121, 122 and 123 and converting power between two ports of these three ports. Port power $P_1$, $P_2$ and $P_3$ are input/output power (input power or output power) of the ports 121, 122 and 123 respectively. Port voltages $V_1$, $V_2$ and $V_3$ are input/output voltages (input voltage or output voltage) of the ports 121, 122 and 123 respectively.

For example, a first port 121 is a terminal to which a high voltage system power supply 141 and a high voltage system load 161 are connected. For example, the power supply 141 and the load 161 are of a 288V system. A secondary battery such as a lithium ion battery may be cited as a specific example of the power supply 141. The power supply 141 is also referred to as a main battery. An inverter which converts direct current (DC) into alternating current (AC) may be cited as a specific example of the load 161. The load 161 may not be connected to the port 121. The number of the power supply 141 and the load 161 may be either singular or multiple.

For example, the second port 122 is a terminal to which a medium voltage system load 162 is connected. For example, the load 162 is of a lower 48V system than the 288V system. A motor assisting a steering operation of a vehicle may be cited as a specific example of the load 162. Depending on the specification of a vehicle, the load 162 may be a motor for controlling the attitude of a vehicle, or a motor for controlling the braking force of a vehicle, or an other load than these. The number of the load 162 may be either singular or multiple.

For example, the third port 123 is a terminal to which a low voltage system power supply 143 and a low voltage system load 163 are connected. For example, the power supply 143 and the load 163 are of a lower 12V system than the 48V system. A secondary battery such as a lead battery may be cited as a specific example of the power supply 143. The power supply 143 is also referred to as an auxiliary battery. A computer of an electronic control unit (so called ECU), a sensor, a lamp, a wiper, a fuel pump, and so on may be cited as specific examples of the load 163, although the load 163 may be an other load than these. The number of the power supply 143 and the load 163 may be either singular or multiple.

The power supply circuit 110 has a converter 111 and a converter 112.

The converter 111 is a first voltage conversion unit for converting the port voltage $V_1$ and outputting the port power $P_2$ having the converted voltage to the port 122. Specifically, the converter 111 is a direct current-direct current (DC-DC) converter which performs a step-down operation of stepping down the port voltage $V_1$ and outputting the port power $P_2$ having the stepped down voltage to the port 122. The converter 111 may further be a step-up/step-down unit which has not only such step-down function of performing the step-down operation but also a step-up function of performing a step-up operation of stepping up the port voltage $V_2$ and outputting the port power $P_1$ having the stepped up voltage to the port 121. In addition, the converter 111 is a DC-DC converter of insulated type in which it insulated between input and output by a transformer such as a converter transformer, although it may also be a DC-DC converter of non-insulated type in which it is not insulated between input and output through a transformer.

The converter 112 is a second voltage conversion unit for switching between a step-down operation of stepping down the port voltage $V_2$ and outputting the port power $P_3$ having the stepped down voltage to the port 122 and a step-up operation of stepping up the port voltage $V_3$ and outputting the port power $P_2$ having the stepped up voltage to the port 122. The converter 112 is a DC-DC converter of non-insulated type, although it may also be a converter of insulated type.

The converter 112 is a step-up/step-down unit for switching between the step-down operation and the step-up operation in response to a vehicle condition affecting the operation of the system connected to the port 122 or the operation of the system connected to the port 123. Since the converter 112 is such a step-up/step-down unit, a voltage conversion operation (i.e., the step-up operation or the step-down operation) suitable for the vehicle condition can be switched to even if the power required for the system connected to the port 122 or the port 123 varies depending on the vehicle condition. In addition, in the case of FIG. 1, the system connected to the port 122 is the load 162, and the system connected to the port 123 is the load 163 or the power supply 143.

For example, the converter 112 switches its own voltage conversion operation from the step-down operation to the step-up operation, when a vehicle condition where power of the port 122 is insufficient is detected during performing the step-down operation, even though it is performing the step-down operation. The situation that the power required for the operation of the load 162 is insufficient may be suppressed by the converter 112 performing the step-up operation in such a case. In addition, even if the converter 112 is performing the step-up operation at this time, it is possible to supply power from the power supply 143 to the load 163, and thus the situation that the power required for the operation of the load 163 is insufficient may be suppressed.

Also, the converter 112 also switches its own voltage conversion operation from the step-down operation to the step-up operation, when a vehicle condition where power of the port 122 is insufficient is predicted during performing the step-down operation, even though it is performing the step-down operation. Thus, since it is possible to switch from the step-down operation to the step-up operation before power of the port 122 is insufficient in practice, the situation that the power required for the operation of the load 162 is insufficient may be prevented in advance.

On the other hand, for example, the converter 112 switches its own voltage conversion operation from the step-up operation to the step-down operation, when a vehicle condition where power of the port 123 is insufficient is detected during performing the step-up operation, even though it is performing the step-up operation. The situation that the power required for the operation of the load 163 or power supply 143 is insufficient may be suppressed by the converter 112 performing the step-down operation in such a case. In addition, even if the converter 112 is performing the step-down operation at this time, it is possible to supply power from the converter 111 to the load 162 connected to the port 122, and thus the situation that the power required for the operation of the load 162 is insufficient may be suppressed.

Also, the converter 112 also switches its own voltage conversion operation from the step-up operation to the step-down operation, when a vehicle condition where power of the port 123 is insufficient is predicted during performing the step-up operation, even though it is performing the step-up operation. Thus, since it is possible to switch from the step-up operation to the step-sown operation before power of the port 123 is insufficient in practice, the situation that the power required for the operation of the load 163 or power supply 143 is insufficient may be prevented in advance.

The sensor unit 170 serves as means that detects or predicts a condition of a vehicle on which the power supply apparatus 100 is mounted. The sensor unit 170 detects whether a current or future vehicle condition is that power of the port 122 is insufficient or whether a current or future vehicle condition is that power of the port 123 is insufficient. The number of the sensor unit 170 may be either singular or multiple.

For example, when the sensor unit 170 detects or predicts that the load 162 will perform an operation requiring power equal to or greater than a predetermined value during the step-down operation of the converter 112, the converter 112 switches from the step-down operation to the step-up operation. The condition that the load 162 will perform the operation requiring power equal to or greater than the predetermined value is a vehicle condition where power of the port 122 is insufficient during the step-down operation of the converter 112. For example, based on an operation signal indicating an operation state of the load 162, the sensor unit 170 detects or predicts the condition that the load 162 will perform the operation requiring power equal to or greater than the predetermined value.

Thus, by switching from the step-down operation to the step-up operation, it is possible to suppress that power required for the operation of the load 162 is insufficient, and it is possible to serve as power supplied from the power supply 143 in the operation of the load 162. Therefore, the situation that the operation of the load 162 is affected by insufficient power of the port 122 may be prevented.

For example, if the load 162 has a motor of assisting a steering operation of a vehicle, the load 162 requires large power when the vehicle is turning due to a steering operation by a driver. Thus, for example, when the sensor unit 170 detects that the vehicle condition is a steering state (for example, it detects that the angle or torque of the steering operation by the driver is equal to or greater than a predetermined threshold), the converter 112 switches from the step-down operation to the step-up operation. Alternatively, for example, when the sensor unit 170 predicts that the vehicle condition is to be a steering state (for example, it predicts this based on onboard navigation information capable of identifying a curve of road and a position of intersection), the converter 112 switches from the step-down operation to the step-up operation.

Thus, by switching from the step-down operation to the step-up operation, it is possible to suppress the situation that the assist force for the steering operation by the load 162 decreases due to insufficient power supply when the load 163 is consuming extremely large power, and it is possible to provide a backup for the assist operation of the load 162 by the power supply 143.

When the sensor unit 170 detects that the load 162 will perform an operation not requiring power equal to or greater than a predetermined value during the step-up operation of the converter 112, the converter 112 may switch from the step-up operation to the step-down operation so as to perform the step-down operation.

For example, when the sensor unit 170 detects or predicts that the load 163 will perform an operation requiring power equal to or greater than a predetermined value during the step-down operation of the converter 112, the converter 112 switches from the step-down operation to the step-up operation. The condition that the load 163 will perform the operation requiring power equal to or greater than the predetermined value is a vehicle condition where power of the port 122 is insufficient during the step-down operation of the converter 112. For example, based on an operation signal indicating an operation state of the load 163, the sensor unit 170 detects or predicts the condition that the load 163 will perform the operation requiring power equal to or greater than the predetermined value.

Thus, by switching from the step-down operation to the step-up operation, it is possible to suppress that power required for the operation of the load 162 is insufficient, and it is possible to serve as power supplied from the power supply 143 in the operation of the load 162. Therefore, the situation that the operation of the load 162 is affected by insufficient power of the port 122 may be prevented.

When the sensor unit 170 detects that the load 163 will perform an operation not requiring power equal to or greater than a predetermined value during the step-up operation of the converter 112, the converter 112 may switch from the step-up operation to the step-down operation so as to perform the step-down operation.

For example, when the sensor unit 170 detects or predicts an abnormal condition of the power supply 141 during the step-down operation of the converter 112, the converter 112 switches from the step-down operation to the step-up operation. The abnormal condition of the power supply 141 is a vehicle condition where power of the port 122 is insufficient during the step-down operation of the converter 112. For example, based on an operation signal indicating an operation state of the power supply 141, the sensor unit 170 detects or predicts the abnormal condition of the power supply 141.

Thus, by switching from the step-down operation to the step-up operation, it is possible to suppress the situation that the power required for the operation of the load 162 is insufficient due to decrease of power supplied by the power supply 141, and it is possible to serve as power supplied from the power supply 143 in the operation of the load 162. Therefore, the situation that the operation of the load 162 is affected by insufficient power of the port 122 may be prevented.

For example, the supply voltage of the power supply 141 being lower than a predetermined voltage value due to temperature drop, a wire connecting the power supply 141 and the port 121 being disconnected, and so on may be cited as abnormities of the power supply 141.

When the sensor unit 170 detects a normal condition of the power supply 141 during the step-up operation of the converter 112, the converter 112 may switch from the step-up operation to the step-down operation so as to perform the step-down operation.

For example, when the sensor unit 170 detects or predicts an abnormal condition of the converter 111 during the step-down operation of the converter 112, the converter 112 switches from the step-down operation to the step-up operation. The abnormal condition of the converter 111 is a vehicle condition where power of the port 122 is insufficient during the step-down operation of the converter 112. For example, based on an operation signal indicating an operation state of the converter 111, the sensor unit 170 detects or predicts the abnormal condition of the converter 111.

Thus, by switching from the step-down operation to the step-up operation, it is possible to suppress the situation that the power required for the operation of the load 162 is insufficient due to decrease of power supplied by the converter 111, and it is possible to serve as power supplied from the power supply 143 in the operation of the load 162.

For example, the operation of the converter 111 stopping abnormally, the power outputted from the converter 111 being lower than a desired value, and so on may be cited as abnormities of the converter 111.

When the sensor unit 170 detects a normal condition of the power supply 141 during the step-up operation of the converter 112, the converter 112 may switch from the step-up operation to the step-down operation so as to perform the step-down operation.

For example, when the sensor unit 170 detects or predicts that the load 161 will perform an operation requiring power equal to or greater than a predetermined value during the step-down operation of the converter 111 and the converter 112, the converter 111 and the converter 112 switch from the step-down operation to the step-up operation respectively. The condition that the load 161 will perform the operation requiring power equal to or greater than the predetermined value is a vehicle condition where power of the port 122 is insufficient during the step-down operation of the converter 111 and the converter 112. For example, based on an operation signal indicating an operation state of the load 161, the sensor unit 170 detects or predicts the condition that the load 161 will perform the operation requiring power equal to or greater than the predetermined value.

Thus, by switching from the step-down operation to the step-up operation, it is possible to suppress that power required for the operation of the load 161 is insufficient, and it is possible to serve as power supplied from the converter 111 in the operation of the load 161. Moreover, by supplying power to the load 161 from the converter 111, it is possible to serve as power supplied from the power supply 143 in the operation of the load 162, even when there is no power supplied from the converter 111 to the load 162, which may suppress that power of the load 162 is insufficient.

When the sensor unit 170 detects that the load 161 will perform an operation not requiring power equal to or greater than a predetermined value during the step-up operation of the converter 111 and the converter 112, the converter 111 or the converter 112 may switch from the step-up operation to the step-down operation so as to perform the step-down operation.

In addition, a power supply may be connected to the port 122. For example, when the sensor unit 170 detects or predicts that the supply capacity of the power supply connected to the port 122 decreases during the step-down operation of the converter 112, the converter 112 switches from the step-down operation to the step-up operation. The condition that the supply capacity of the power supply connected to the port 122 decreases is a vehicle condition where power of the port 122 is insufficient during the step-down operation of the converter 112. For example, based on an operation signal indicating an operation state of the power supply connected to the port 122, the sensor unit 170 detects or predicts that the supply capacity of the power supply connected to the port 122 decreases.

Thus, by switching from the step-down operation to the step-up operation, it is possible to suppress that power required for the operation of the load 162 is insufficient, and it is possible to serve as power supplied from the power supply 143 in the operation of the load 162. Therefore, the situation that the operation of the load 162 is affected by insufficient power of the port 122 may be prevented.

For example, the supply voltage of the power supply being lower than a predetermined voltage value, the charge amount charged to the power supply being lower than a predetermined value, and so on may be cited as the decrease of the supply capacity of the power supply connected to the port 122.

For example, when the sensor unit 170 detects or predicts that the supply capacity of the power supply 143 decreases during the step-up operation of the converter 112, the converter 112 switches from the step-up operation to the step-down operation. This is because that, when the converter 112 performs the step-up operation, even when the converter 111 performs the step-down operation, the converter 112 is not able to supply power required by the power supply 143 or the load 163. The condition that the supply capacity of the power supply 143 decreases is a vehicle condition where power of the port 123 is insufficient during the step-up operation of the converter 112. For example, based on an operation signal indicating an operation state of the power supply 143, the sensor unit 170 detects or predicts that the supply capacity of the power supply 143 decreases.

Thus, by switching from the step-up operatic% to the step-down operation, it is possible to suppress that power required for the operation of the load 163 or the power supply 143 is insufficient, and it is possible to serve as power supplied from the converter 112 in the operation of the load 163 or the power supply 143. Therefore, the situation that the operation of the load 163 or the power supply 143 is affected by insufficient power of the port 123 may be prevented.

For example, the supply voltage of the power supply 143 being lower than a predetermined voltage value, the charge amount charged to the power supply 143 being lower than a predetermined value, and so on may be cited as the decrease of the supply capacity of the power supply 143.

When the sensor unit 170 detects that the supply capacity of the power supply 143 does not decrease during the step-down operation of the converter 112, the converter 112 switches from the step-down operation to the step-up operation so as to perform the step-up operation.

For example, when the sensor unit 170 detects or predicts that the load 163 will perform an operation requiring power equal to or greater than a predetermined value during the step-up operation of the converter 112, the converter 112 switches from the step-up operation to the step-down operation. The condition that the load 163 will perform the operation requiring power equal to or greater than the predetermined value is a vehicle condition where power of the port 123 is insufficient during the step-up operation of the converter 112. For example, based on an operation signal indicating an operation state of the load 163, the sensor unit 170 detects or predicts the condition that the load 163 will perform the operation requiring power equal to or greater than the predetermined value.

Thus, by switching from the step-up operation to the step-down operation, it is possible to suppress that power required for the operation of the load 163 is insufficient, and it is possible to serve as power supplied from the converter 112 in the operation of the load 163. Therefore, the situation that an operation of the load 163 is affected by insufficient power of the port 123 may be prevented.

For example, if the load 163 has a lamp for illuminating surrounding of the vehicle, the load 163 requires large power due to lighting of the lamp when it is relatively dark around the vehicle (for example, when it is at night or the vehicle is in a tunnel). Therefore, for example, depending on whether the vehicle condition detected or predicted by the sensor unit 170 is a condition to light the lamp, the converter 112 switches to the step-down operation or the step-up operation.

For example, onboard navigation information capable of determining a position of a tunnel, timing information, illumination information around the vehicle, lighting information of the lamp, operation information for lighting the lamp, and so on may be cited as information obtained by the sensor unit 170 for detecting or predicting whether a vehicle condition is a condition to light the lamp.

When the sensor unit 170 detects or predicts that the condition around the vehicle is a condition to light the lamp (for example, it is at night or the vehicle is in a tunnel) during the step-up operation of the converter 112, the converter 112 switches from the step-up operation to the step-down operation. In this way, the situation that the brightness of the lamp fluctuates due to voltage variation caused by insufficient power may be prevented.

On the other hand, when the sensor unit 170 detects that the condition around the vehicle is not a condition to light the lamp (for example, it is in daytime or the vehicle is in outdoors) during the step-down operation of the converter 112, the converter 112 switches from the step-down operation to the step-up operation. In this way, it is possible to suppress that power of the port 122 is insufficient.

For example, if the load 163 has a wiper for wiping the window of the vehicle, the load 163 requires large power due to the operation, of the wiper when it is raining around the vehicle. Therefore, for example, depending on whether the vehicle condition detected or predicted by the sensor unit 170 is a condition to actuate the wiper, the converter 112 switches to the step-down operation or the step-up operation.

For example, precipitation information, operation information of the wiper, operation information to actuate the wipe, and so on may be cited as information obtained by the sensor unit 170 for detecting or predicting whether a vehicle condition is a condition to actuate the wiper.

When the sensor unit 170 detects or predicts that the condition around the vehicle is a condition to actuate the wiper (for example, when it is raining or the like) during the step-up operation of the converter 112, the converter 112 switches from the step-up operation to the step-down operation. In this way, the situation that the speed of the wiper fluctuates due to voltage variation caused by insufficient power may be prevented.

On the other hand, when the sensor unit 170 detects that the condition around the vehicle is not a condition to actuate the lamp (for example, it is sunny or the like) during the step-down operation of the converter 112, the converter 112 switches from the step-down operation to the step-up operation. In this way, it is possible to suppress that power of the port 122 is insufficient.

For example, if the load 163 has a fuel pump for drawing fuel from a fuel tank of the vehicle, the load 163 requires large power due to the operation of the fuel pump when the vehicle is traveling. Therefore, for example, depending on whether the vehicle condition detected or predicted by the sensor unit 170 is a condition to actuate the fuel pump, the converter 112 switches to the step-down operation or the step-up operation.

For example, vehicle speed information, engine speed information, operation information of the fuel pump, and so on may be cited as information obtained by the sensor unit 170 for detecting or predicting whether a vehicle condition is a condition to actuate the fuel pump.

When the sensor unit 170 detects or predicts that a condition that the vehicle is traveling during the step-up operation of the converter 112, the converter 112 switches from the step-up operation to the step-down operation. In this way, the situation that the revolution speed of a motor of the fuel pump fluctuates due to voltage variation caused by insufficient power may be prevented.

On the other hand, when the sensor unit 170 detects that a condition that the vehicle is not traveling during the step-down operation of the converter 112, the converter 112 switches from the step-down operation to the step-up operation. In this way, it is possible to suppress that power of the port 122 is insufficient.

The control unit 150 serves as control means that controls the voltage conversion operation of the converter 111 or the converter 112 to the step-up operation or the step-down operation based on the detection result or prediction result of the vehicle condition obtained by the sensor unit 170. The control unit 150 has a microcomputer, for example.

Figure 2:
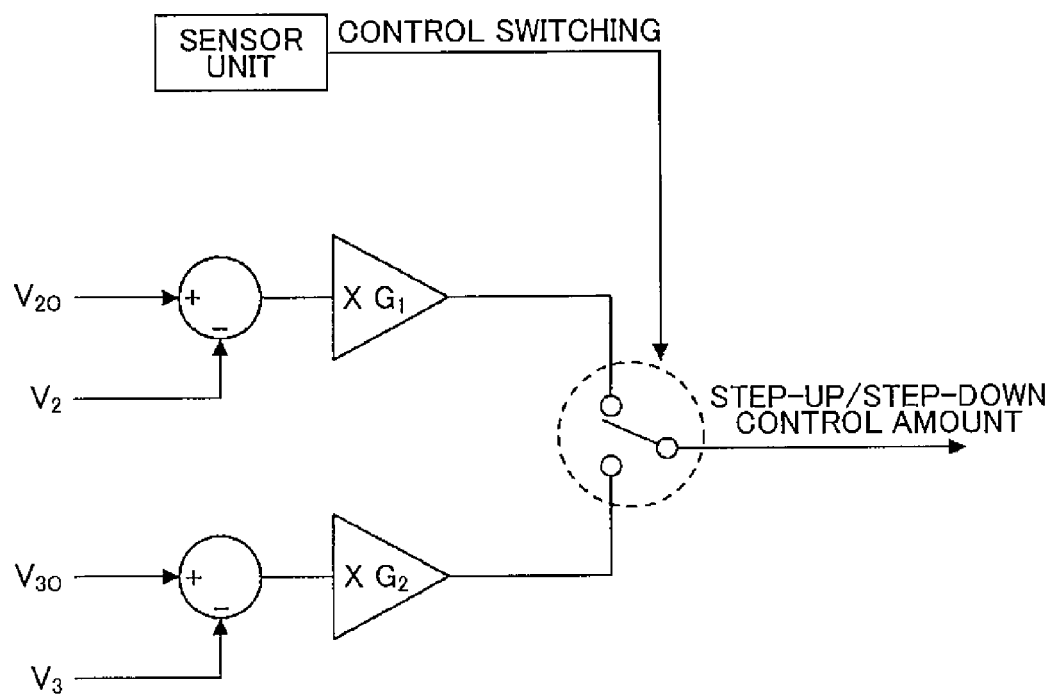
FIG. 2 is a diagram showing an example of a power conversion method.

FIG. 2 is a block diagram showing a power conversion method performed by the control unit 150. Depending on the vehicle condition detected or predicted as mentioned above by the sensor unit 170, the control unit 150 switches the control method of the converter 112. For example, the control unit 150 switches a target voltage for calculating a step-up/step-down control amount of the converter 112 depending on the vehicle condition detected or predicted by the sensor unit 170, and controls the converter 112 to perform the step-up operation or the step-down operation. For example, the step-up/step-down control amount Do is a command value of a duty ratio D or an ON time δ for adjusting a step-up/step-down ratio of the converter 112. The step-up/step-down ratio of the converter 112 is a voltage transformation ratio between the port 122 and the port 123.

In the case that the control unit 150 causes the converter 112 to perform the step-up operation, the control unit 150 performs a Proportional-Integral-Derivative (PID) control based on a deviation between a target port voltage $V_{2O}$ of the port 122 and a detected voltage of the port voltage $V_2$ obtained by the sensor unit 170. The control unit 150 calculates the step-up/step-down control amount ($=G_1 \times (V_{2O}-V_2)$) by performing the PID control. $G_1$ denotes a proportional gain of the PID control. The control unit 150 causes the converter 112 to perform the step-up operation with the calculated step-up/step-down control amount, such that the deviation between the target port voltage $V_{2O}$ and the detected voltage of the port voltage $V_2$ can converge to zero.

On the other hand, in the case that the control unit 150 causes the converter 112 to perform the step-down operation, the control unit 150 performs a PID control based on a deviation between a target port voltage $V_{3O}$ of the port 123 and a detected voltage of the port voltage $V_3$ obtained by the sensor unit 170. The control unit 150 calculates the step-up/step-down control amount ($=G_2 \times (V_{3O}-V_3)$) by performing the PID control. $G_2$ denotes a proportional gain of the PID control. The control unit 150 causes the converter 112 to perform the step-down operation with the calculated step-up/step-down control amount, such that the deviation between the target port voltage $V_{3O}$ and the detected voltage of the port voltage $V_3$ can converge to zero.

<Configuration of Power Supply Apparatus 101>

Figure 3:
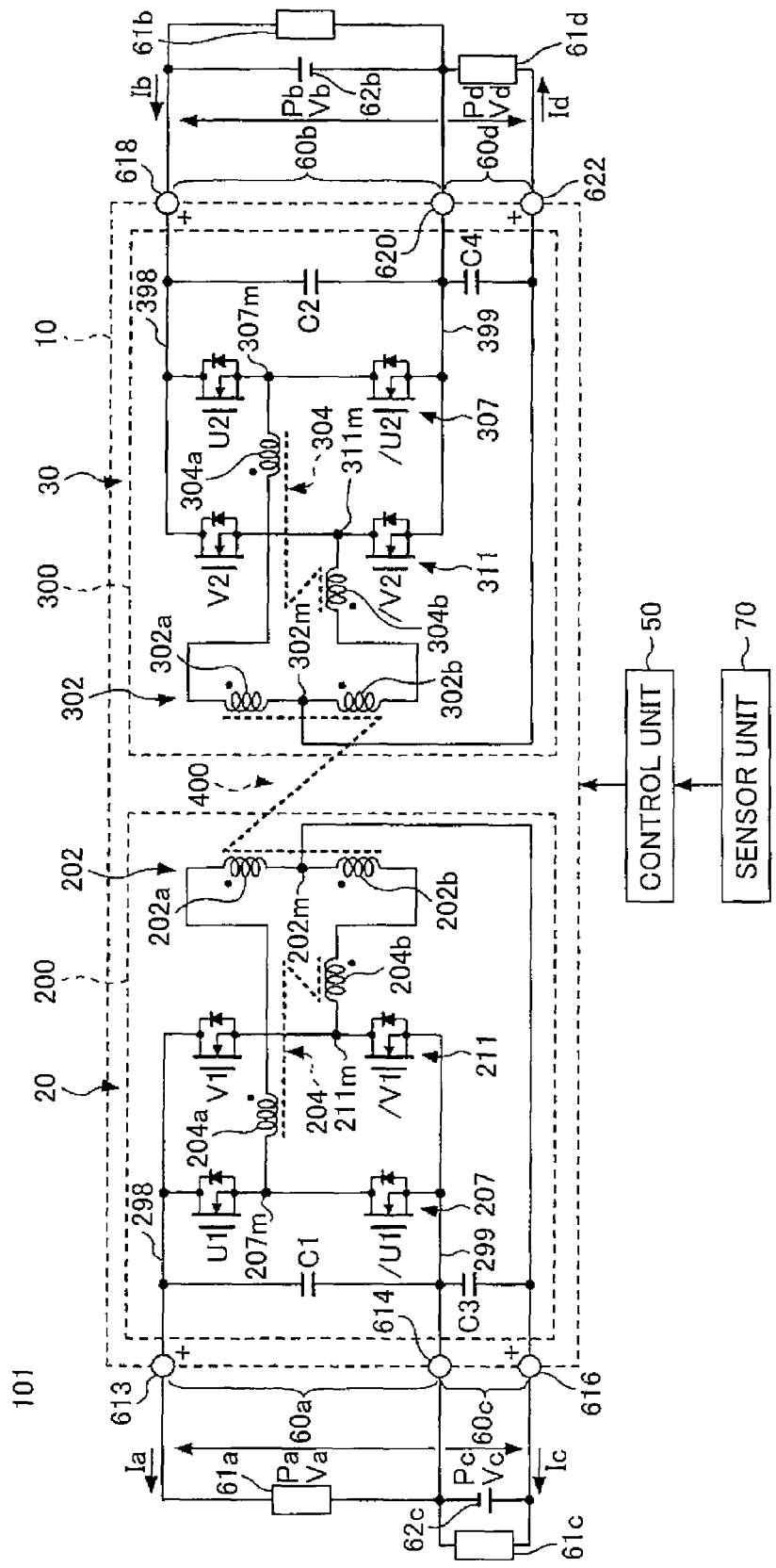
FIG. 3 is a diagram showing an example of a configuration of a power conversion apparatus.

FIG. 3 is a block diagram showing an example of a configuration of a power supply apparatus 101 serving as an embodiment of the power conversion apparatus. The power supply apparatus 101 is a detailed example of the power supply 100 of FIG. 1, which has the same function and effect as those of the power supply 100. The converter 111 of FIG. 1 includes a primary side full-bridge circuit 200 and a secondary side full-bridge circuit 300 magnetically coupled with the primary side full-bridge circuit 200 through a transformer 400. On the other hand, the converter 112 of FIG. 1 includes the primary side full-bridge circuit 200 shared with the converter 111.

The first port 121, the second port 122 and the third port 123 in FIG. 1 correspond to a third input/output port 60b, a first input/output port 60a and a second input/output port 60c in FIG. 3, respectively. The power supply 141 and the power supply 143 in FIG. 1 correspond to a secondary side high voltage system power supply 62b and a primary side low voltage system power supply 62c in FIG. 3, respectively. The load 161, the load 162 and the load 163 in FIG. 1 correspond to a secondary side high voltage system load 61b, a primary side high voltage system load 61a and a primary side low voltage system load 61c in FIG. 3, respectively. The control unit 150 and the sensor unit 170 in FIG. 1 correspond to a control unit 50 and a sensor unit 70 in FIG. 3, respectively.

A power supply circuit 10 including the primary side full-bridge circuit 200 and the secondary side full-bridge circuit 300 changes a phase difference φ between the switching of the primary side full-bridge circuit 200 and the switching of the secondary side full-bridge circuit 300, and outputs power to the first input/output port 60a. Changing of the phase difference φ and outputting of the power will be described later.

The power supply apparatus 101 achieves functions of the converter 111 and the converter 112 both through an integral structure configured to include the primary side full-bridge circuit 200, the transformer 400 and the secondary side full-bridge circuit 300. Because the functions of both of them are achieved through the integral structure, it is possible to control the port power $P_1$, the port power $P_2$ or the port power $P_3$ to be a desired power in a high precision, and control the port voltage $V_1$, the port voltage $V_2$ or the port voltage $V_3$ to be a desired voltage in a high precision, as compared to a separate structure. In addition, by designing as the integral structure, the situation that a deviation occurs in the switching timing or the inductance between respective power supply apparatuses can be suppressed. Therefore, it is possible to control the port power and the port voltages to be desired values in a high precision.

The power supply apparatus 101 will be described in detail below.

For example, the power supply apparatus 101 is a power supply system that includes the power supply circuit 10, the control unit 50, and the sensor unit 70. For example, the power supply apparatus 101 is a system mounted on a vehicle such as an automobile, and distributes power to various loads mounted on the vehicle. A hybrid vehicle, a plug-in hybrid vehicle, an electric vehicle, and so on may be cited as specific examples of this vehicle. The power supply apparatus 100 may also be mounted on a vehicle using an engine as a driving source.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting any two input/output ports from the four input/output ports and performing power conversion between the two selected input/output ports. Further, the power supply apparatus 101 including the power supply circuit 10 may be a apparatus that includes a plurality of, at least three, input/output ports, and is capable of converting power between any two input/output ports from the plurality of, at least three, input/output ports and performing power conversion between the two selected input/output ports. For example, the power supply circuit 10 may be a circuit that has three input/output ports without the fourth input/output port 60d.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Further, the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer). A primary side port configured of the first input/output port 60a and the second input/output port 60c is connected to a secondary side port configured of the third input/output port 60b and the fourth input/output port 60d via the transformer 400.

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 3, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as a power transmission amount. For example, the target transmitted power Po is a command value set by the control unit 50 or a predetermined apparatus other than the control unit 50 on the basis of a deviation between the detected value Yd and the target value Yo in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference $\phi$ and a duty ratio D (an ON time $\delta$) are used as the main control parameters X.

The phase difference $\phi$ is a deviation (a time lag) between switching timings of identical-phase power conversion circuit units of the primary side full bridge circuit 200 and the secondary side full bridge circuit 300. The duty ratio D (the ON time $\delta$) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference $\phi$ and the duty ratio D (the ON time $\delta$).

Figure 4:
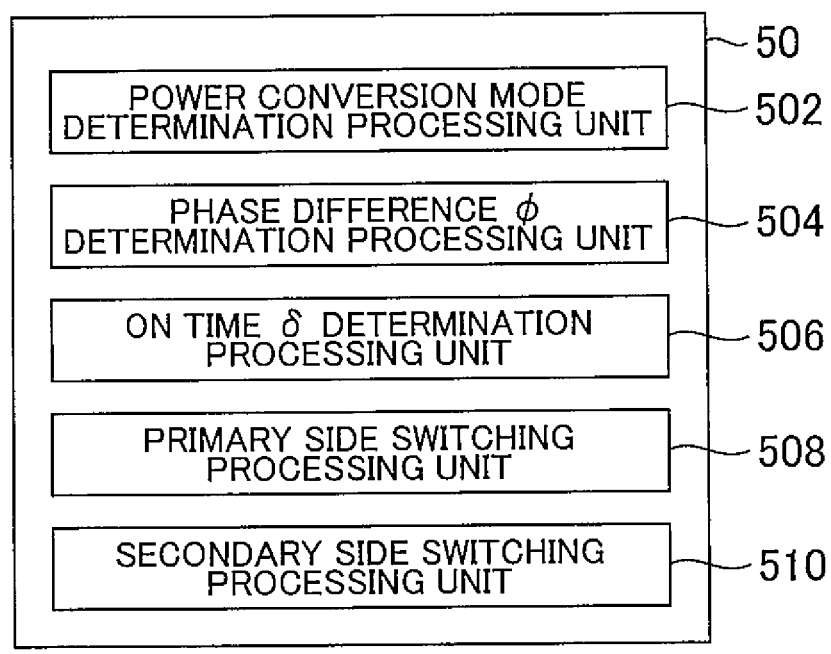
FIG. 4 is a diagram showing an example of a configuration of a control unit.

FIG. 4 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference $\phi$ determination processing unit 504, an ON time $\delta$ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply circuit 10 to function as a DC-DC converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference φ determination processing unit 504, and the ON time δ determination processing unit 506.

<Operation of Power Supply Apparatus 101>

An operation of the power supply apparatus 101 having the above configuration will now be described using FIGS. 3 and 4. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary aide conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 5:
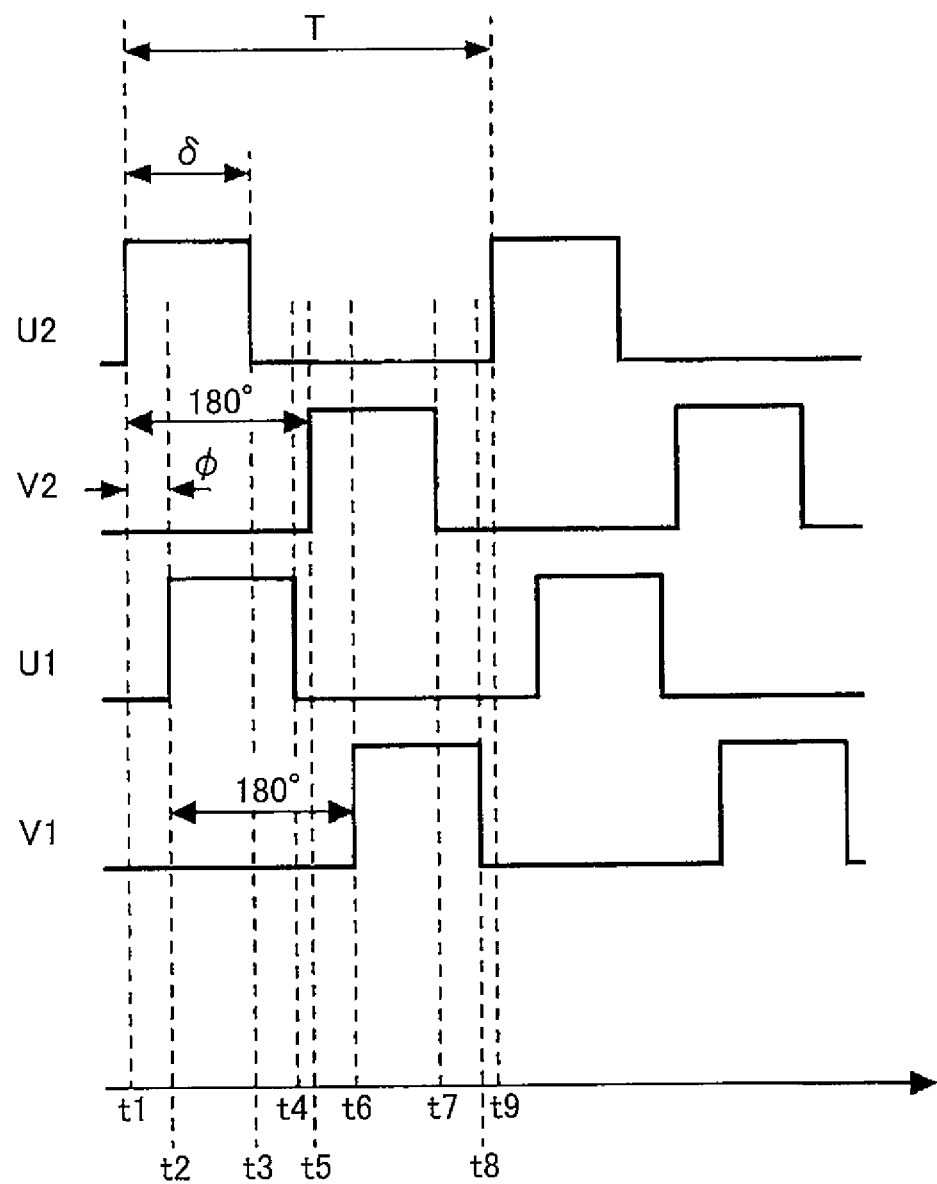
FIG. 5 is a timing chart showing an example of switching a primary side circuit and a secondary side circuit.

FIG. 5 is a view showing a timing chart of ON/OFF switching waveforms of the respective arms provided in the power supply circuit 10 resulting from control executed by the control unit 50. In FIG. 5, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 5, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20=the voltage of the second input/output port 60c/the voltage of the first input/output port 60a=δ11/T =α/T, and the step-up/step-down ratio of the secondary side conversion circuit 30=the voltage of the fourth input/output port 60d/the voltage of the third input/output port 60b=δ12/T=α/T. In other words, the respective step-up/step-down ratios of the primary side conversion circuit 20 and the secondary side conversion circuit 30 take identical values (=α/T).

Note that the ON time δ in FIG. 5 represents both the ON time δ11 of the primary side first upper arm U1 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). Moreover, by changing the phase difference φ between U1 and U2, the power transmission amount P between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P=(N\times Va\times Vb)/(\pi\times\omega\times L)\times F(D,\phi) \quad \text{Equation 1}$$

Note that N is a winding ratio of the transformer 400, Va is the input/output voltage of the first input/output port 60a, Vb is the input/output voltage of the third input/output port 60b, π is pi, ω (=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The control unit 50 changes the phase difference φ such that a port voltage Vp of at least one predetermined port of the primary side ports and the secondary side ports converges to a target port voltage Vo, thereby to adjust the transmitted power P. Therefore, even if the current consumed by a load connected to the predetermined port increases, the control unit 50 can adjust the transmitted power P by changing the phase difference φ, thereby to prevent the port voltage Vp from decreasing with respect to the target port voltage Vo.

For example, the control unit 50 changes the phase difference φ such that a port voltage Vp of one port that is the transmission destination of the transmitted power P of the primary side ports and the secondary side ports converges to a target port voltage Vo, thereby to adjust the transmitted power P. Therefore, even if the current consumed by a load connected to the port that is the transmission destination of the transmitted power P increases, the control unit 50 may adjust the transmitted power P in an increase direction by changing the phase difference φ to increase, thereby to prevent the port voltage Vp from decreasing with respect to the target port voltage Vo.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Further, in FIG. 3, although the primary side low voltage system power supply 62c is connected to the second input/output port 60c, the power supply may be connected to neither the first input/output port 60a nor the second input/output port 60c.

Further, the present invention is suitable for a power conversion apparatus that has a plurality of, at least three or more, input/output ports and is capable of converting power between any two input/output ports of the plurality of, at least three or more, input/output ports. For example, the present invention is also suitable for the power supply apparatus configured to not include any one input/output port of the four input/output ports as illustrated in FIG. 3.

Further, in the above description, the primary side may be defined as the second side, and the second side may be defined as the primary side.

What is claimed is:

1. A power conversion apparatus, having a plurality of ports and converting power among the plurality of ports, comprising:
    a first voltage conversion unit, configured to convert a voltage of a first port and output power having the converted voltage to a second port; and
    a second voltage conversion unit, configured to perform a first operation of converting a voltage of one port of the second port and a third port and outputting power having the converted voltage to the other port, or a second operation of converting a voltage of the other port and outputting power having the converted voltage to the one port,
    wherein during performing the first operation, the second voltage conversion unit switches from the first operation to the second operation when a vehicle condition is detected in which power of the one port required for an operation of a load is insufficient.

2. The power conversion apparatus according to claim 1, wherein
    when an operation is detected that a load connected to the one port or the other port requires power equal to or greater than a predetermined value, the second voltage conversion unit switches from the first operation to the second operation.

3. The power conversion apparatus according to claim 1, wherein
    when it is detected that a power supply capacity of a power supply connected to the one port or the other port decreases, the second voltage conversion unit switches from the first operation to the second operation.

4. The power conversion apparatus according to claim 1, wherein
    the one port is the second port, and the other port is the third port.

5. The power conversion apparatus according to claim 4, wherein
    when an abnormality of the first voltage conversion unit is detected or when an abnormality of a power supply connected to the first port is detected, the second voltage conversion unit switches from the first operation to the second operation.

6. The power conversion apparatus according to claim 5, wherein
    the abnormality of the power supply is that the voltage of the power supply decreases.

7. The power conversion apparatus according to claim 4, wherein
    when an operation is detected that a load connected to the first port requires power equal to or greater than a predetermined value, the second voltage conversion unit switches from the first operation to the second operation, and the first voltage conversion unit switches to an operation of converting a voltage of the second port and outputting power having the converted voltage to the first port.

8. The power conversion apparatus according to claim 4, wherein
    a load connected to the one port is a load assisting a steering operation of a vehicle.

9. The power conversion apparatus according to claim 1, wherein
    the one port is the third port, and the other port is the second port.

10. The power conversion apparatus according to claim 9, wherein
    if a load connected to the one port is a lamp, the second voltage conversion unit switches from the first operation to the second operation when a condition where the lamp is lighted is detected.

11. The power conversion apparatus according to claim 9, wherein
if a load connected to the one port is a wiper, the second voltage conversion unit switches from the first operation to the second operation when a condition where the wiper is operating is detected.

12. The power conversion apparatus according to claim 9, wherein
if a load connected to the one port is a fuel pump, the second voltage conversion unit switches from the first operation to the second operation when a condition where the fuel pump is operating is detected.

13. The power conversion apparatus according to claim 1, wherein
the first voltage conversion unit includes a primary side full-bridge circuit to which the second port and the third port are connected and a secondary side full-bridge circuit to which the first port is connected, the secondary side full-bridge circuit being magnetically coupled with the primary side full-bridge circuit through a transformer, and the primary side full-bridge circuit is shared by the first voltage conversion unit and the second voltage conversion unit, and the first voltage conversion unit outputs power to the second port by changing a phase difference between the switching of the primary side full-bridge circuit and the switching of the secondary side full-bridge circuit.

14. The power conversion apparatus according to claim 1, wherein
a case that the vehicle condition is detected is a case that the vehicle condition is predicted.

15. A power conversion method for converting power among a plurality of ports, comprising:
converting a voltage of a first port and outputting power having the converted voltage to a second port; and
switching to a first operation of converting a voltage of one port of the second port and a third port and outputting power having the converted voltage to the other port, and switching from the first operation to a second operation of converting a voltage of the other port and outputting power having the converted voltage to the one port when a vehicle condition is detected in which power of the one port required for an operation of a load is insufficient during performing the first operation.

* * * * *